May 12, 1953 J. EVANS 2,638,499

COLOR TELEVISION SYSTEM

Filed Jan. 24, 1950 3 Sheets-Sheet 1

INVENTOR
John Evans
BY
[signature]
ATTORNEY

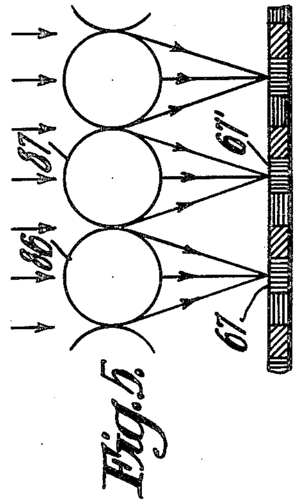
Fig. 5.
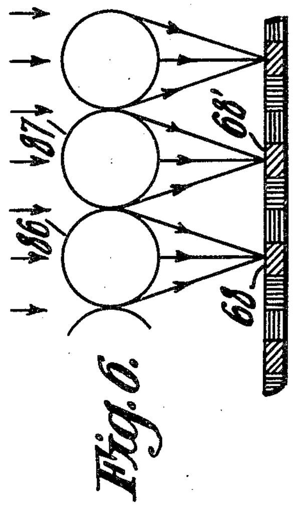
Fig. 6.
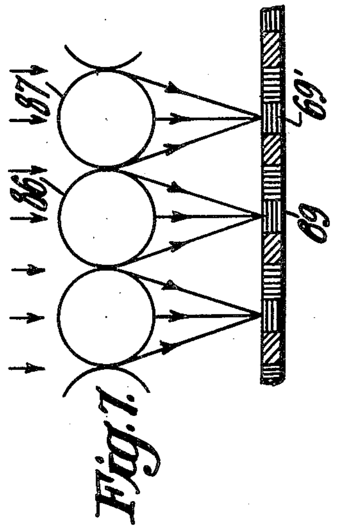
Fig. 7.
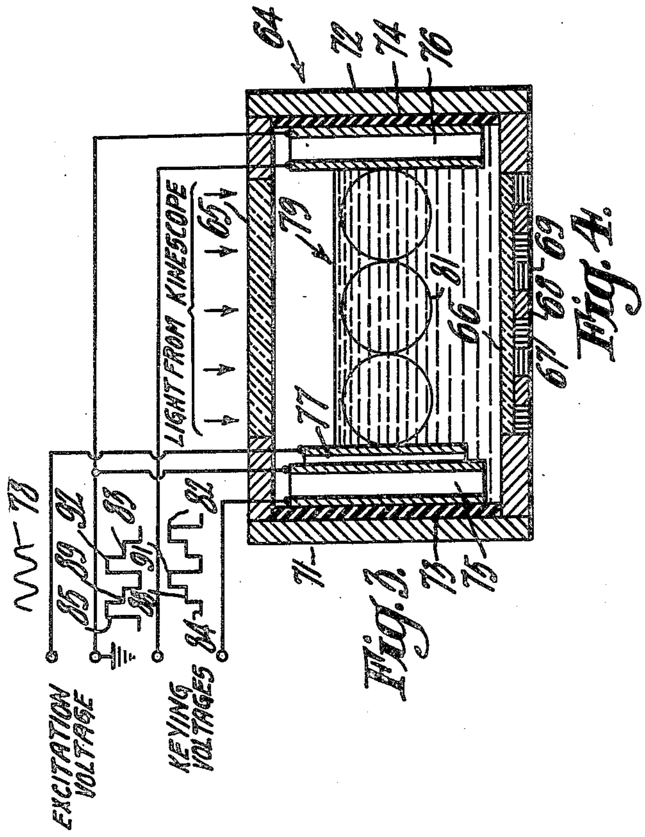
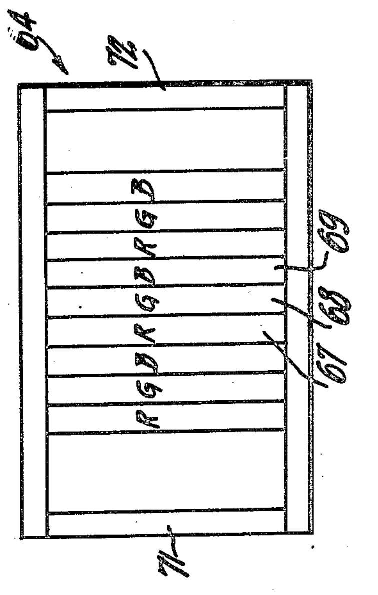
Fig. 4.
INVENTOR
John Evans
BY
Chas. J. Mitchell
ATTORNEY May 12, 1953 J. EVANS 2,638,499

COLOR TELEVISION SYSTEM

Filed Jan. 24, 1950 3 Sheets-Sheet 3

INVENTOR
John Evans
BY Olin J. Mitchell
ATTORNEY

Patented May 12, 1953

2,638,499

UNITED STATES PATENT OFFICE 2,638,499

COLOR TELEVISION SYSTEM

John Evans, Blawenburg, N. J., assignor to Radio Corporation of America, a corporation of Delaware Application January 24, 1950, Serial No. 140,223

16 Claims. (Cl. 178—5.4)

This invention relates to color television system and particularly, but not necessarily exclusively, to color filter devices employed in such systems.

One of the systems for reproducing by television methods images substantially in their natural colors which, in theory at least, is relatively simple is that type of system in which the different color components of the image to be reproduced are displayed as black and white partial images and which are viewed or projected through a succession of differently colored light filters. The color filters which previously have been employed have been ones which require mechanical movement whereby to successively interpose in the light path filter sections having respectively the properties of transmitting differently colored light. Filter devices of this character have required a driving mechanism which has the disadvantage of producing noise and vibration. Such disadvantages may be overcome by employing a color filter of the type embodied in this invention.

Furthermore, a mechanically movable filter device has a definite speed limitation by reason of which it has not been possible to display the successive partial color television images in sufficiently rapid succession to overcome completely a perceptible color flicker.

Moreover, because of the speed limitations of a filter device of the mechanically movable type, it is necessary that the image be reproduced in complete fields or frames of the different color components thereof. Consequently, the color changes are not effected rapidly enough to completely eliminate color fringes when the subject matter of the image comprises relatively fast action such as that occurring in certain types of athletic contests, for example, where balls or other objects are caused to move at relatively high rates of speed or in performances such as juggling acts, to cite but a few typical examples. Mechanically movable color filters of the prior art are obviously not susceptible of operation at frequencies of the order of the elemental picture dot frequencies. Therefore, they may not be utilized in systems such as the so-called dot multiplex color television system covered by a copending United States application of John Evans, Serial No. 111,384, filed August 20, 1949 and entitled "Color Television." Such a system is substantially free from many of the inherent limitations such as color fringing of other types of prior art systems.

Accordingly, it is an object of the present invention to provide an improved color television system embodying colored light filter devices requiring no mechanical movement thereof.

Another object of the invention is to provide an improved color television system embodying a colored light filter which is operable at field or frame frequencies, at horizontal line frequencies or even at elemental picture dot frequencies.

Still another object of the invention is to provide an improved color filter device for use in color television systems and which is operated entirely electrically and has no moving parts.

A further object of the invention is to provide an improved color filter embodying a plurality of fixed or stationary color filter elements and employing an electrically controlled optical system to vary the direction of the light path through the device.

A still further object of the invention is to provide an improved color filter device for use in a color television system which employs the optical properties of standing waves in a transparent medium to selectively direct light through a multiplicity of differently colored light transmitting sections.

According to the invention, there is provided an improved color television system embodying at both the transmitter and the receiver locations a novel colored light filter having no moving parts and being susceptible of operation entirely electrically. At the transmitting station or other pickup point colored light from the television subject is passed through selected sections of the filter device capable respectively of transmitting the light of predetermined colors onto the photosensitive electrode of a television image signal generating tube. The video signals developed in this manner are transmitted as desired to one or more receiving stations either by space radiation or by suitable conductors and are representative of the different color components of the subject. The received video signals are employed to reproduce black and white partial images of the subject which are projected for viewing through a non-mechanical, electrically-operated color filter device in accordance with a feature of this invention.

The color filter device in accordance with this invention includes a stationary translucent area which is sub-divided into a multiplicity of sections capable, respectively, of transmitting differently colored light. There also is provided, in spaced relationship to the translucent color area, a transparent section which receives white light from the image reproducing device. The space between the translucent and transparent sections of the color filter device includes a transparent medium in which there may be produced standing pressure waves which have the optical property of focussing the incident light onto correspondingly colored components of the translucent section. In one illustrative embodiment of the invention, the color filter device also includes an electromechanical vibratory member which, when suitably energized, produces pressure waves in the transparent medium. The device also includes a highly reflecting wall from which the pressure waves may be reflected to form standing waves in the medium. By means of a pair of additional electromechanical vibratory devices, the standing waves may be shifted laterally in the medium so as to selectively direct the incident light onto a succession of different color transmitting sections of the translucent area.

The novel features that are considered characteristic of this invention are set forth with particularity in the appended claims. The invention itself, however, both as to its organization and method of operation, as well as additional objects and advantages thereof, will best be understood from the following description taken in connection with the accompanying drawing, in which:

Figures 3 and 4 are horizontal sectional and front elevational views respectively of a color filter device embodying the invention;

Figure 9:
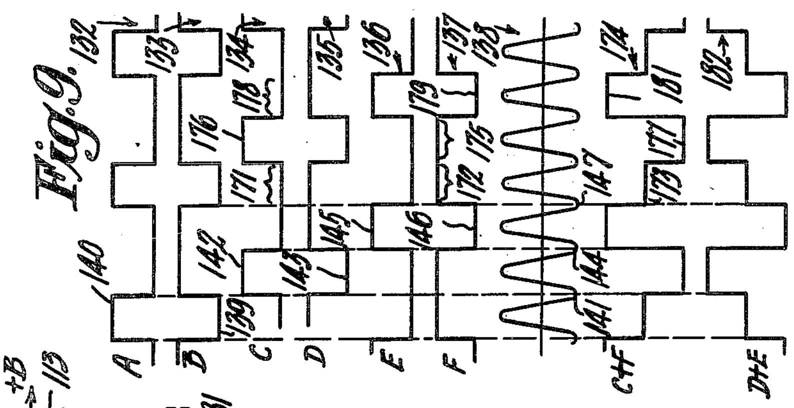
Figures 8, 10:
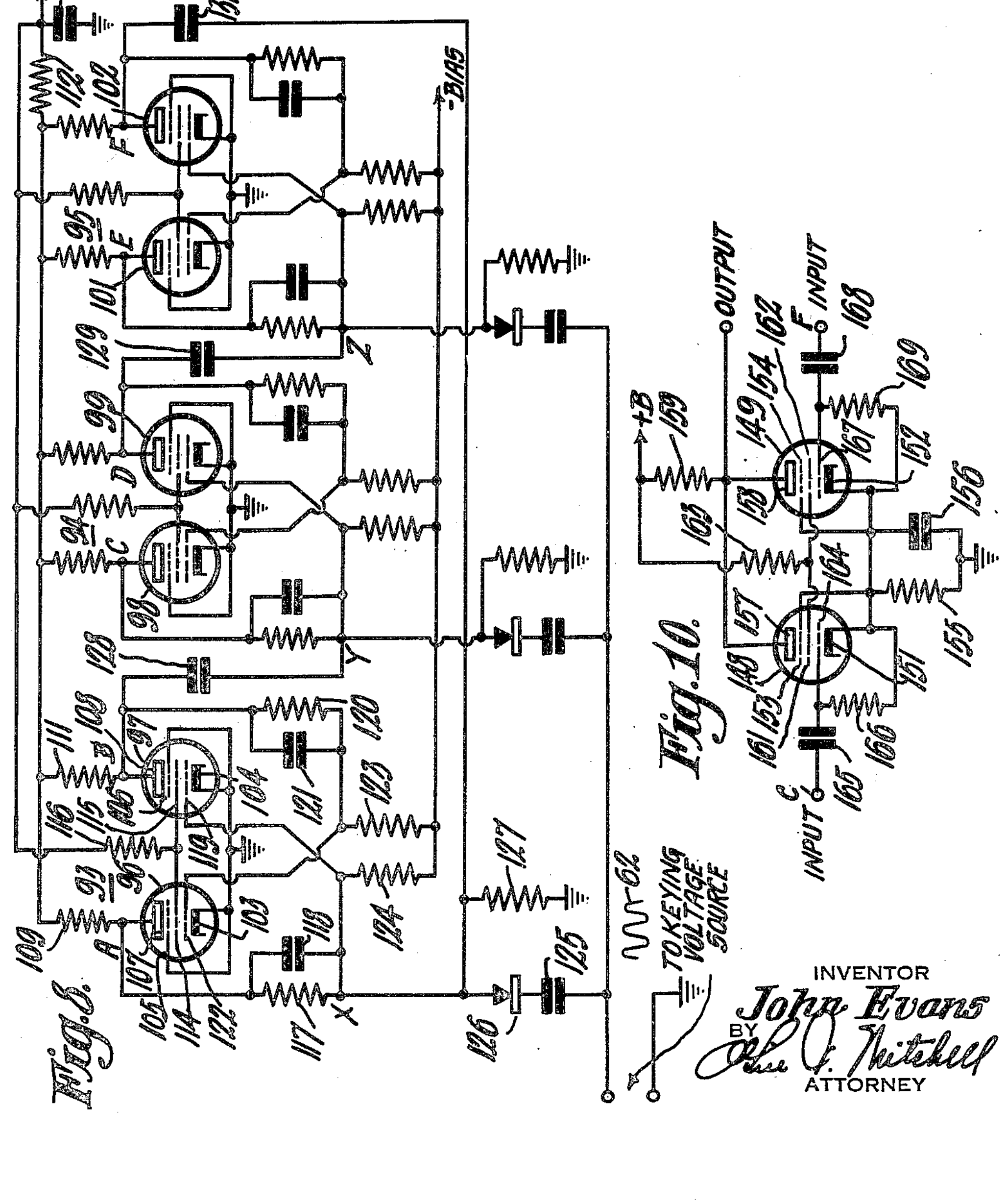

Figures 5, 6, and 7 are fragmentary diagrammatic representations showing the operation of the color filter device in accordance with the invention;

Figure 8 is a circuit diagram of one means of developing the necessary control voltages for operation of the color filter devices in accordance with the invention;

Figure 9 is a series of curves representing waveforms of voltages developed at different points of the circuits of Figures 8 and 10 for reference in explaining the operation of these voltage developing circuits; and, Figure 10 is another circuit diagram of typical apparatus by means of which the voltages developed by means of apparatus such as that shown in Figure 8 may be combined to develop one control voltage for operation of the color filter device according to this invention.

Figure 1:
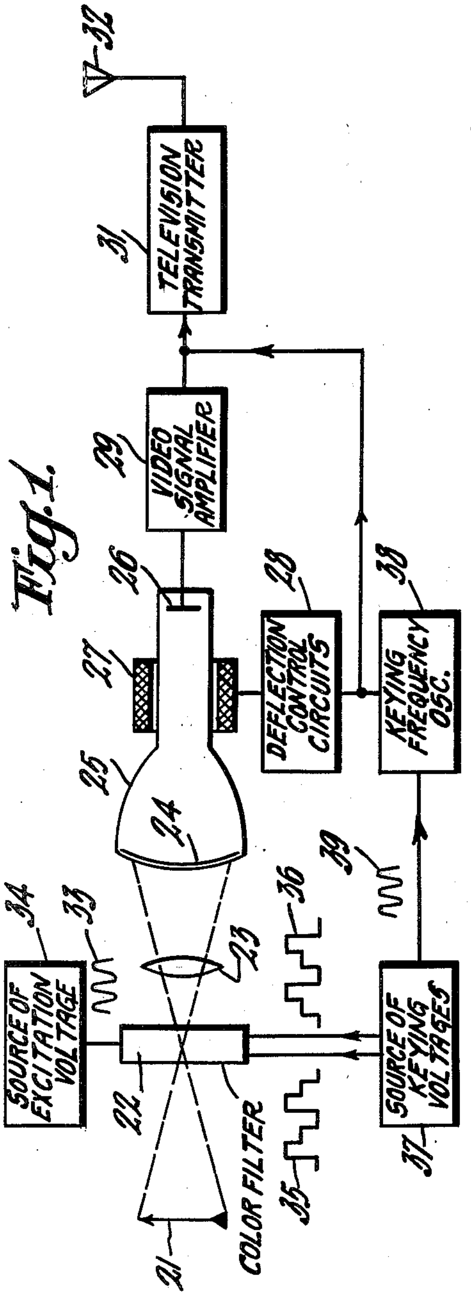
Figure 1 is a diagrammatic representation of a video signal generating apparatus according to the invention and embodying a color filter device in accordance with the invention.

Having reference first to Figure 1 of the drawings, there is shown in block diagram form the major essential components of a television transmitting apparatus embodying the present invention. The television subject which is represented by an arrow 21 is illuminated in the usual manner and the light reflected therefrom is projected through a color filter device 22 constructed in accordance with the present invention and the particle component color images of the subject are further projected by means of a suitable optical system represented at 23 upon the photosensitive electrode 24 of a television pickup or camera tube 25. The particular type of camera tube employed is immaterial, it merely being necessary to systematically analyze the optical image of the television subject to develop at an output electrode 26 a train of video signals representative respectively of the different component colors of the subject.

The analysis of the optical image projected upon the electrode 24 is effected under the control of a deflection system represented by the yoke 27, the particular form of which will depend, in some measure, upon the type of camera tube employed. The deflection system is operated by the impression thereon of suitable energy derived from deflection control circuits 28.

The video signals generated at the output electrode 26 are amplified by a video signal amplifier 29 and are impressed upon a transmitter 31 for suitable modulation of a carrier wave. Also, system control signals derived from the deflection control circuits 28 are impressed upon the transmitter 31 for suitable mixing with the video signals to form a composite television system for radiation by means of an antenna 32.

The color filter 22, in accordance with this invention, requires excitation for the purpose of producing the standing waves by means of which to effect color selection. In this form of the invention, the medium in which the standing waves are to be produced is excited by means of a sinusoidal voltage such as represented at 33 which may be derived from a source of excitation voltage 34. In order to variably position the standing waves within the transparent medium of the color filter 22, there are employed two oppositely-phased voltages having stepped waveforms such as represented at 35 and 36, both of which may be derived from a source of keying voltages 37. In order that the color selecting voltages 35 and 36 be properly related in time to the video signals developed by the camera tube 25, the source of keying voltages 37 is controlled by a keying frequency oscillator 38 which is synchronized from the deflection control circuits 28 to produce a sine wave voltage such as that represented at 39 having a frequency equal to or harmonically related to the frequency at which the color changes of the video signals is effected.

Figure 2:
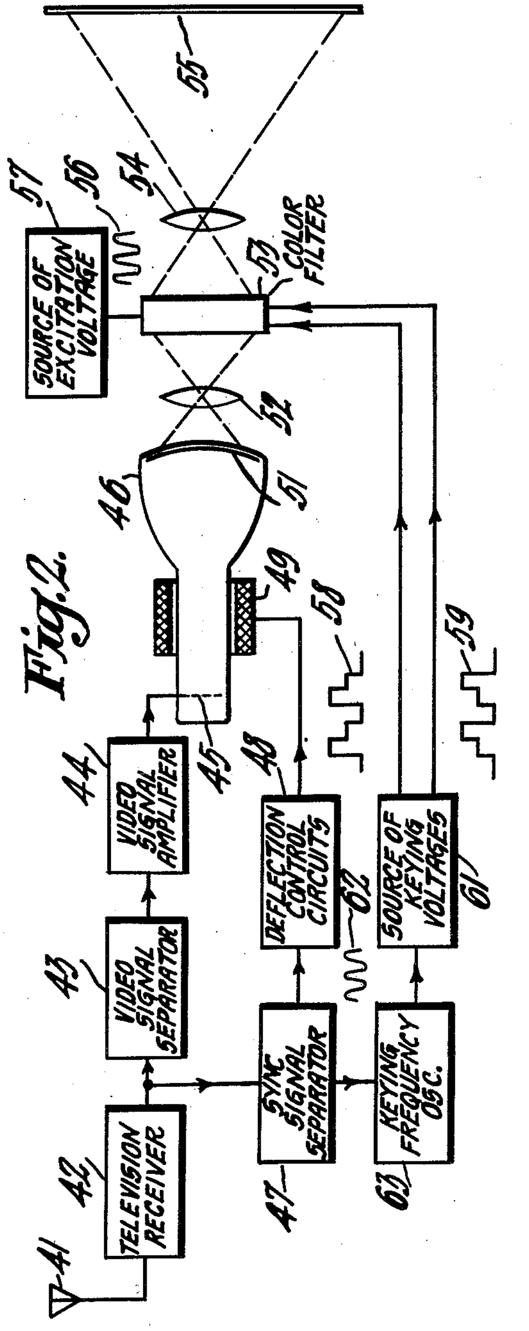
Figure 2 is a similar diagrammatic circuit structure of an image reproducing system in accordance with the invention.

In Figure 2, there is shown the major essential circuit components of receiving apparatus required to reproduce, from received video signals transmitted in the manner described, an image of the television subject substantially in its natural colors. The receiving apparatus comprises a carrier wave intercepting antenna 41 to which is coupled the usual television receiver 42. It will be understood that the receiver 42 may include apparatus such as one or more stages of radio frequency signal amplification, a frequency converted or first detector, one or more stages of intermediate frequency signal amplification and a signal or second detector. Accordingly, it will be understood that the signals derived from the television receiver 42 are composite television signals including the video signal component and the system control signals, such as the horizontal and vertical synchronizing pulses. The output circuit of the television receiver 42 is coupled to a video signal separator 43 by means of which the video signals are recovered to the exclusion of the system control signals. The video signals developed in the output circuit of the separator 43 are amplified by a video signal amplifier 44 and impressed upon the electron beam intensity control electrode such as a grid 45 of a monochromatic image reproducing device such as a cathode ray tube 46.

The composite television signals developed in the output circuit of the receiver 42 also are impressed upon a synchronizing signal separator 47 by means of which the system control signals such as the horizontal and vertical synchronizing pulses are recovered to the exclusion of the video signal component. The system control signals are impressed upon deflection control circuits 48 by means of which there are produced scanning voltages for impression upon a deflection yoke 49 of the cathode ray tube 46, whereby to effect deflection of the electron beam over the usual luminescent screen 51 for the reproduction of the television image. The black and white television images reproduced upon the screen 51 are translated through a condensing lens system represented at 52 through a color filter device 53 in accordance with this invention and finally projected by means of a projection system represented at 54 onto a viewing screen 55.

The color filter device 53 may be similar to the device 22 at the transmitting station and may be energized for the creation of standing waves when excited by a sinusoidal voltage such as that represented at 56 and derived from a source of excitation voltage 57. Also, the control of the standing waves in the color filter device for color selection purposes is effected under the control of oppositely-phased voltages having stepped waveforms such as represented at 58 and 59 derived from a source of keying voltages 61. As in the transmitting apparatus, the source of keying voltages in this embodiment of the invention is controlled by a sinusoidal voltage such as represented at 62 and which may be derived from a keying frequency oscillator 63 synchronized by means of the system control signals derived from the synchronizing signal separator 47.

Aside from the details of the color filter devices used at the transmitting and receiving stations respectively and the manner in which they function to generate video signals representative of the color components of the television subject and to reproduce from such signals television images substantially in their natural colors, it is considered that the general operation of the color television system described is somewhat obvious. However, the general operation will be described briefly with particular reference to a system operating according to the dot multiplex principle such as that disclosed in the copending Evans application to which reference has been made.

In such a system, assuming a three color reproduction, each elemental area of the subject is analyzed in succession for the three color content thereof. The train of video signals generated by the camera tube 25 thus consists of three video signals representing respectively the three colors of one elemental area of the subject followed immediately by three additional video signals representing respectively the three color component of the next succeeding elemental area of the subject. In such a system, therefore, it is necessary that the color filter device, by means of which such an analysis of the subject is made, be of such a character that, during the analysis of each elemental area of the subject, it be susceptible of transmitting the light reflected from the subject onto the photoelectric electrode 24 through three distinctively colored filter sections. It, therefore, is necessary that the light derived from the subject be switched at a frequency which is three times the dot or elemental area frequency. A similar requirement also is necessary at the receiving station. It is obvious that mechanically movable color filter devices are incapable of meeting such a requirement. The transmitting apparatus of Figure 1, accordingly, functions to project light from the subject 21 onto the photoelectric cathode 24 of the camera tube 25 which is changed in color by the filter device 22 in the manner described so that as succeeding elemental areas of the electrode 24 are scanned, there are developed at the output electrode 26 video signals of the character described.

At the receiving station of Figure 2 the apparatus functions substantially in the same manner as the transmitting apparatus except, of course, that the video signals are translating into light, the color of which, when projected upon the screen 55, is varied by means of the color filter 53 to reproduce an image of the television subject substantially in its natural and original colors.

In order to more clearly understand the nature of the color filter device and its mode of operation, reference now will be made to Figures 3 and 4 of the drawings. The color filter device consists essentially of a material which is not only transparent but which also has substantial acoustic rigidity. There are many substances possessing both of these characteristics among which are certain solids, such as a high grade of paraffin and numerous liquids such as kerosene, carbon tetrachloride, carbon disulphide, and nitrobenzol. Assume for the purpose of the present disclosure that a liquid material such as kerosene is used. It may be confined by a container such as a small rectangular hollow casing 64, the top and bottom and ends of which may be formed entirely of metal or any other suitable material. Consider that the illustration of Figure 3 is a horizontal cross sectional view of the container 64 so that, as seen in the drawing, a horizontal plane of the device is illustrated. The side wall of the container which is faced toward the kinescope is provided with a plain transparent area 65 formed, for example, of a good grade of glass or transparent plastic material. The opposite and substantially parallelly arranged wall of the container 64 also preferably has a transparent inner portion 66 which, for purposes of illustrative disclosure, will be considered as glass.

On the outer surface of the glass wall 66 is provided a plurality of translucent differently colored sections, for example, red, green, and blue light transmitting elements such as 67, 68, and 69, respectively. In a preferred form of the invention, the color filter elements such as 67, 68, and 69 have striated configurations as better illustrated in Figure 4. It will be noted that the color filter sections are provided in groups of three in which the same color sequence is repeated in all groups. It also is considered to be more practical to provide a multiplicity of color filter groups in order to minimize, insofar as it is considered practical to do so, the distance through which the standing waves have to be moved in order to selectively direct the light in the manner desired. The number of color filter sections that may be employed is subect to certain limitations such as the grain size of the photographic emulsion used to form the sections in accordance with a preferred embodiment of the invention, the degree of accuracy with which the standing waves may be controlled, and the like. One practical arrangement which has been successfully employed is to provide color filter striations in number equal substantially to 100 per inch. It should be understood, however, that such a structure is disclosed herein only for illustrative purposes. Color filter striations of the order of 500 to the inch have been produced. It, however, is considered to be unnecessary to employ a filter structure of this degree of fineness for ordinary purposes because, as will be more completely explained hereinafter, the width and/or number of the color filter sections do not in any way affect the resolution or definition of the image to be reproduced. Furthermore, it is entirely practical to effect movements of the standing waves at the relatively high frequency required over distances approximately equal to $\frac{1}{100}$ of an inch.

Adjacent each of the end walls 71 and 72 of the container 64 and insulated therefrom as indicated at 73 and 74 is mounted a pair of substantially identical electromechanical vibratory devices such as piezolelectric quartz crystals 75 and 76. Also, there is mounted an exciting crystal 77 on the face of one of the pair of crystals such as 75 as shown.

The crystal 77 is excited by means of an alternating voltage such as represented by the wave 78 at a frequency which is sufficiently high to produce pressure waves in the material within the container 64 corresponding to the number of color filter striations such as 67, 68, and 69. The inner or free face of the crystal 76 provides a good reflecting surface for the pressure waves generated by the crystal 77 so that a reflected pressure wave is developed in opposite phase for each of the impinging waves created by the crystal 77. As a result, a standing wave pattern such as that represented at 79 is produced. As a result of this standing wave pattern, the pressure of the material within the container 64 varies substantially in accordance with the waveform of the voltage 78 by which the crystal 77 is excited. While not necessarily limited thereto a sinusoidal excitation of the crystal 77 is disclosed so that the pressure variation in the optical material also will have a sinusoidal variation. The refractive index of the material within the container 64 varies in accordance with the pressure of the material. Accordingly, there are produced by means of the standing wave represented at 79 what, in effect, are cylindrical lenses such as 81. Each of the cylindrical lenses functions to focus the light impinging thereon, derived from the kinescope and transmitted thereto through the transparent window 65, onto one of the color filter striations such as 67, 68 and 69.

There is impressed upon the crystal 75 a voltage of one polarity having a stepped waveform such as shown at 82. There also is impressed upon the crystal 76 a similar voltage of opposite phase such as represented at 83. As a consequence, the inner or free faces of the crystals 75 and 76 are caused to move simultaneously in opposite directions and by substantially equal amounts. The movement of the inner face of the crystal 75 also causes a similar movement of the entire body of the exciting crystal 77. Inasmuch as the inner faces of the crystals 75 and 76 are moved in the manner described, the distance between the inner face of the exciting crystal 77 and the inner or reflecting face of the crystal 76 remains substantially constant and the effect is to shift the standing wave pattern laterally relative to the colored filter striations such as 67, 68, and 69.

To further explain the manner in which the color filter device, in accordance with this invention, operates to effect the reproduction of television images substantially in their natural colors, reference will be made to the fragmentary diagrammatic illustrations of Figures 5, 6, and 7. In Figure 5 is shown the position of the standing wave when the crystals 75 and 76 are energized respectively by voltages having the relative magnitudes shown by the steps 84 and 85 of the voltage waves 82 and 83. The incident image-representative white light which impinges upon the effective cylindrical lenses such as 86 and 87 is refracted and focused substantially onto the red light transmitting striations such as 67 and 67′ of the color filter. It will be understood that the light impinging upon all others of the effective cylindrical lenses is similarly focused onto red portions of the filter. It will be seen that there is substantially no loss of light except that relatively small portion which is absorbed in transmission through the filter device. Consequently, all of the light collected from the kinescope screen and caused to impinge upon the filter device is directed through the red light transmitting sections.

In Figure 6 are indicated the positions of the effective cylindrical lenses 86 and 87 relative to the color filter screen when voltages having the relative magnitudes indicated by the steps 88 and 89 of the voltage waves 82 and 83 are respectively impressed upon the crystals 75 and 76. It will be observed that the effective lenses 86 and 87 have been moved far enough to the right as viewed in the drawing to cause the focussing of the incident white light impinging thereon through the green light transmitting sections such as 68 and 68′ of the color filter.

Similarly, Figure 7 graphically illustrates the positions of the effective cylindrical lenses 86 and 87 relative to the filter screen when the crystals 75 and 76 are further distorted under the control of voltages such as represented by the steps 91 and 92 of the voltage waves 82 and 83, respectively. In these positions, it will be seen that the lenses 86 and 87 are effective to focus the incident white light onto the blue light transmitting sections such as 69 and 69′ of the color filter screen.

It will be understood that, at the next succeeding instant, the described cycle of operation is repeated by suitable energization of the crystals 75 and 76 to shift the effective cylindrical lenses back to the positions shown in Figure 5.

A presently preferred method of forming the striated color filter screen utilizes the standing waves produced in the device much in the same manner as they are employed in actual operation. This method comprises the employment of photographic techniques, the first step of which is to apply a coating of a fine grain photographic emulsion to the exterior surface of the transparent side wall 66. The exciting crystal 77 is suitably energized in the manner described to set up the standing waves forming the effective cylindrical lenses. Steady unidirectional voltages are applied to the crystals 75 and 76 having respective magnitudes corresponding, for example, to the steps 84 and 85 of the voltage waves 82 and 83. Light, which may be substantially white, for example, is then directed through the transparent window 65 onto the effective cylindrical lenses which, under the conditions described, effect the concentration of this light into striations corresponding, for example, to the strips such as 67. Instead of white light, blue or ultra-light may be used, particularly if the emulsion is more sensitive to such light. Consequently, corresponding strips of emulsion are exposed to light so that upon subsequent development of the emulsion, there will be produced a bar structure comprising reduced silver. The silver images of the light bars are then converted to a silver-cyanide complex which serves as a mordant for an acid dye. Alternatively, a soft gelatine emulsion may be light sensitized with a chromate exposed to the light, after which the unexposed portions of the emulsion may be washed away. The remaining tanned images of the light bars may then be colored with an acid dye. In either case, the bar structure produced is dyed a particular color such as red, for example.

Then, the portions of the exterior surface of the transparent side wall 66 disposed between the red bars or striations are again coated with a photographic emulsion. The crystals 75 and 76 then are energized by steady unidirectional voltages having magnitudes such as represented by the steps 88 and 89 of the voltage waves 82 and 83. In accordance with the operation of the device previously described, the standing waves forming the effective cylindrical lenses are shifted toward the right substantially into the position shown in Figure 6. The emulsion is then exposed to light directed thereto by the effective cylindrical lenses so that the portions of the emulsion positioned substantially in correspondence with the striations such as 68 are exposed to light. The previously-described process is repeated except that in this case the bars are dyed green.

Finally, the described process is again repeated with the crystals 75 and 76 energized by unidirectional voltages having magnitudes such as represented by the steps 91 and 92, respectively, of the voltage waves 82 and 83. The emulsion coating on the remaining portions of the exterior surface of the transparent side wall 66 are then exposed to light and dyed blue.

It will be seen that, by reason of the employment of the described process in the formation of the striated color filter screen under substantially the same conditions occurring in the operation of the device, very accurate registry of the light focussed by the effective cylindrical lenses with the respective differently colored striations of the color filter is effected.

In order for a color filter device of the character described to operate satisfactorily, it is necessary that the effective cylindrical lenses formed by the standing waves be capable of focussing the light in such a manner that, in the plane of the color filter screen, the light striations have widths substantially equal to one-half the distance by which adjacent edges of successive light strips are separated. This requirement may be satisfactorily met by suitably controlling the excitation of the material with which the container 64 is filled by means of the crystal 77. The particular excitation required in any given case depends essentially upon the character of the medium in which the standing waves are to be produced. In general, the amplitude of the voltage by which the crystal 77 is excited is inversely proportional to the width of the light line produced in the plane of the color filter section. This is a result of the fact that an increase in the amplitude of excitation causes an increase in the pressure produced by the standing waves and the fact that an increase in the pressure causes an increase in the index of refraction of the medium in the region of the standing waves. An increase in the index of refraction produces an increase in the concentration of light or, in other words, the light is focussed into a smaller area. It will be seen, therefore, that by suitable adjustment of the excitation of the crystal 77 a striated light pattern of the desired form may be produced.

In view of the fact that the color filter device in accordance with this invention is interposed in the light path in such a manner that it is completely out of focus, the number of striations of which the filter device consists theoretically is immaterial. The picture resolution is, in no way, dependent upon the number of filter striations. However, in order to minimize the distance through which the standing waves have to be shifted for color selecting purposes and, consequently, to minimize the necessary distortion of the inner or free faces of the crystals 75 and 76, it is desirable to provide a substantial number of color filter striations. Accordingly, it has been determined that in a practical embodiment of the invention approximately 100 striations per inch provides a suitable structure. It, therefore, is necessary to shift the standing waves by no more than approximately $\frac{2}{100}$ of an inch to effect color selection in a three color system.

It is necessary, of course, to set up within the medium filling the container 64 standing waves of such a character that there is provided an effective cylindrical lens for each group of three color filter striations. This may be effected by a suitable choice of the frequency of the voltage by which the crystal 77 is excited. The number of effective cylindrical lenses which are produced by the standing waves is a function not only of the frequency of the voltage by which the crystal 77 is excited but also of the velocity factor or rate of wave propagation of the medium within the container 64.

There also are minimum requirements regarding the relationship between the frequency of the voltage by which the crystal 77 is excited and the stepped wave voltages by which the crystals 75 and 76 are excited. In a three color television system, for example, it is necessary that the exciting voltage for the crystal 77 have a frequency which is at least three times the frequency at which the energization of the crystals 75 and 76 is varied. Accordingly, the crystals may be ground to such sizes that the crystal 77 has a resonant frequency which is at least three times the resonant frequency of the crystals 75 and 76.

Where a color filter device of the character described is to be used in a color television system of the dot multiplex type, the frequency at which the crystals 75 and 76 are required to operate is relatively high, corresponding to three times (in a three color system) the elemental or dot scanning frequency. It is seen that to grind a crystal for use as the exciting crystal 77 so that it has a resonant frequency which is effectively nine times the elemental or dot scanning frequency would result in an extremely thin structure. It has been determined, however, that satisfactory performance of a device of this character may be secured by exciting the crystal 77 at an odd harmonic of its fundamental or resonant frequency. In the case where the crystal 77 is excited at its third harmonic frequency, for example, it will be seen that in order to meet the requirements described, it may be of substantially the same size as the crystals 75 and 76.

A structure of this character is preferred for the additional reason that three identical crystals may be used.

Reference is made now to Figures 8, 9 and 10 for disclosure of typical examples of certain of the circuit components which may be employed in the illustrative embodiment of the invention. Initially, reference will be made particularly to Figure 8 wherein there are illustrated some of the details of a typical keying voltage source such as indicated generally at 37 of Figure 1 and at 63 of Figure 2. This portion of the keying voltage source of Figure 8 is commonly known as a ring multivibrator. It consists of as many multivibrator units as there are color components of the image to be reproduced. In the present instance, wherein it is assumed that the invention is embodied in a three color system, the keying voltage source consists of three multivibrator units 93, 94 and 95. The circuit details of each of these multivibrator units are substantially identical in the respective units and, consequently, only one such unit will be described particularly.

The multivibrator unit 93 includes a pair of electron tubes 96 and 97; the multivibrator 94 includes electron tubes 98 and 99; and the multivibrator 95 includes electron tubes 101 and 102. The cathodes 103 and 104, respectively, of tubes 96 and 97 are connected together and also to the respective suppressor grids 105 and 106, and are maintained at ground or other fixed potential. The anodes 107 and 108, respectively, of the tubes 96 and 97 are connected through individual load resistors 109 and 111, respectively, and also through a common voltage-dropping resistor 112 to the positive terminal of a source of space current indicated at +B which also is bypassed to ground by a capacitor 113. The screen grids 114 and 115, respectively, of the tubes 96 and 97 are connected together and through a common voltage-dropping resistor 116 to the terminal +B. The anode 107 of the tube 96 is cross-coupled by means of a network including a parallel arrangement of a resistor 117 and a capacitor 118 to the control grid 119 of the tube 97. Similarly, the anode 108 of the tube 97 is cross-coupled by means of a parallel arrangement of a resistor 120 and a capacitor 121 to the control grid 122 of the tube 96. These cross-coupling arrangements are conventional in multivibrator practice and further description thereof is, accordingly, considered unnecessary. The control grids 119 and 122, respectively, of tubes 97 and 96 are suitably biased relative to their associated cathodes by means of the connection thereof through respective resistors 123 and 124 to a suitable source of negative biasing voltage indicated at —Bias.

The multivibrators 93, 94 and 95 are provided respectively with output terminals A—B, C—D and E—F and also respectively with input terminals X, Y and Z. For controlling the timing of the operation of the ring multivibrator the input terminals are coupled to a source of a timing wave such as the keying frequency oscillator 38 of Figure 1 or 63 of Figure 2. For example, the input terminal X of the multivibrator 93 is coupled to the keying frequency oscillator by means of a circuit which includes a series arrangement of a capacitor 125 and a unilaterally conducting device such as a crystal diode 126 and a shunt resistor 127. The diode 126 is connected in the circuit in such polarity that only the negative half cycles of the timing voltage wave, such as 62, are effective to control the operation of the ring multivibrator. Preferably, the parameters of the coupling circuit to the input terminals X, Y and Z of the ring multivibrators are so chosen that only the peaks of the negative half cycles of the voltage wave 62 are effective.

The output terminal B of the multivibrator 93 is coupled by a capacitor 128 to the input terminal Y of the multivibrator 94. Similarly, the output terminal D of the multivibrator 94 is coupled by a capacitor 129 to the input terminal Z of the multivibrator 95. In like manner, the output terminal F of multivibrator 95 is coupled by a capacitor 131 to the input terminal X of multivibrator 93. For the purpose of deriving one of the stepped voltage waves such as 58 of Figure 2 for use in connection with the present invention, the voltage developed at the output terminals C and F of multivibrators 94 and 95 respectively are utilized.

The manner in which the ring multivibrator of Figure 8 operates to generate the individual voltages which may be suitably combined to produce the required stepped voltage waves 35 and 36 of Figure 1 or 58 and 59 of Figure 2 will be described with additional reference to Figure 9. In this figure, the waveforms 132 to 137 represent respectively the voltages developed at the multivibrator output terminals A to F. The wave 138 represents the sinusoidal voltage output derived from the keying frequency oscillator 63 of Figure 2. A cycle of operation will be assumed to start at a time at which the tubes 97, 98, and 101 are conducting and the tubes 96, 99 and 102 are non-conducting. At this time, the voltage developed at the output terminal B has a minimum positive magnitude as indicated at 139 of curve 133 and the voltage developed at the output terminal A has a maximum positive magnitude as indicated at 140 of curve 132. At the occurrence of the next succeeding negative peak 141 of the timing voltage wave 138, there is impressed a negative voltage upon the input terminals X, Y and Z. The impression of this negative voltage upon the control grids of the multivibrator tubes 99 and 102 is ineffective for the reason that these tubes are non-conducting. However, the impression of this negative voltage upon the control grid 119 of the tube 97 effects the termination of space current conduction in this tube with the concomitant initiation of the conduction of space current in the tube 96 in accordance with well known multivibrator operation. Consequently, there is developed a voltage at the output terminal B of the multivibrator 93 which is of increased positive magnitude as indicated by the curve 133 so that, by means of the coupling capacitor 128, a positive voltage is impressed upon the input circuit of the tube 99 of the multivibrator 94. As a result, conduction of space current is initiated in this tube and is terminated in the companion tube 98. The voltage developed at the output terminal C, therefore, increases to a positive maximum as indicated at 142 of the curve 134 and the voltage developed at the output terminal D decreases to a positive minimum as indicated at 143 of the curve 135.

The next succeeding negative peak 144 of the timing wave 138 is ineffective to control tubes 97 and 102 but is effective to terminate the conduction of space current in the tube 99, whereupon the conduction of space current in the tube 98 is again initiated. The increased positive voltage developed at the output terminal D of the multivibrator 94, as indicated by the curve 135, when impressed by the coupling capacitor 129 upon the input circuit of the tube 102 of multivibrator 95 is effective to initiate the conduction of space current in this tube, as a result of which the conduction of space current in the tube 101 is terminated. Consequently, the voltage developed at the output terminal E increases to a positive maximum as indicated at 145 of the curve 136 and the voltage developed at the output terminal F decreases to a positive minimum as indicated at 146 of the curve 137.

The occurrence of the following negative peak 147 of the timing wave 138 is ineffective to control tubes 97 and 99, but effects the termination of the conduction of space current in the tube 102 which is effective to again initiate the conduction of space current in the tube 101. The voltage developed at the output terminal F increases to a positive maximum as indicated by the curve 137 which, when impressed by the coupling capacitor 131 upon the input circuit of the tube 97 of multivibrator 93, again initiates the conduction of space current in this tube. The described cycle of operation then is repeated.

The voltage represented by the curves 134 and 137, derived respectively from the output terminals C and F of the ring multivibrator of Figure 8 are combined by a keying voltage adder, forming another portion of the keying voltage source 37 of Figure 1 or 61 of Figure 2, and shown in Figure 10 for the production of the stepped voltage wave 35 of Figure 1 or 58 of Figure 2. Referring now to Figure 10, the keying voltage adder includes electron tubes 148 and 149 which, by way of example, are shown as pentodes. The cathodes 151 and 152 and the associated suppressor grids 153 and 154 of the tubes 148 and 149, respectively, are connected together and through a self-biasing network comprising a parallel arrangement of a resistor 155 and a capacitor 156 to ground or other point of fixed reference potential. The anodes 157 and 158, respectively, of the tubes 148 and 149 are connected together to the output circuit and through a common load resistor 159 to a suitable source of space current for the tubes indicated at +B. The screen grids 161 and 162, respectively, of the tubes 148 and 149 are connected together and through a common voltage-dropping resistor 163 to the +B terminal. The control grid 164 of the tube 148 is coupled to the output terminal C of the keying voltage source by a series capacitor 165 with which is associated a shunt-connected leak resistor 166. Similarly, the control grid 167 of the tube 149 is coupled by a series capacitor 168 and a shunt-connected leak resistor 169 to the output terminal F of the keying voltage source.

The keying voltage adder of Figure 10 operates substantially in the following manner. There is impressed upon the control grid 164 of the tube 148 a voltage having the waveform illustrated by the curve 134 of Figure 9. Similarly, there is impressed upon the control grid 165 of the tube 149 a voltage having substantially the waveform shown by the curve 137 of Figure 9. It will be noted that the voltage wave 134 has a maximum positive amplitude during a period of unit length and a minimum positive amplitude for two succeeding periods of unit lengths. Also, it will be seen that the voltage wave 137 has a minimum positive amplitude for a period having a unit length and a maximum positive amplitude for two succeeding periods of unit lengths. Also, by comparing the time relationship of the voltage waves 134 and 137, it will be seen that, during the periods indicated at 171 and 172, respectively, the voltage at the output terminal F is maximum while the voltage at the output terminal C is minimum.

Let it be assumed that, in response to the impression of minimum positive voltages upon the respective control grids of the adder tubes 148 and 149, the input circuit biasing of these tubes is of such a character that the tubes conduct space current of minimum magnitude. In some instances, it may be desirable to so bias these tubes that, under such conditions, conduction of space current therein is completely interrupted. Assume for the purpose of the present invention that the latter condition prevails. Accordingly, during the interval represented by 171 and 172 of the curves 134 and 137, space current is conducted in the tube 149 only. As a result of the voltage drop produced in the load resistor 159 by this space current, there is developed at the output terminal of the keying voltage adder a voltage of intermediate magnitude as represented by the step 173 of the curve 174 of Figure 9 representing the waveform of the output voltage derived from the adder.

In the next succeeding period the input voltage to the control grid 167 of the tube 149 remains unchanged as indicated at 175 of the curve 174, while the magnitude of the input voltage to the control grid 164 of the tube 148 is increased to a positive maximum as indicated at 176 of the curve 134. As a result, space current also is conducted in the tube 148 having a magnitude which will be assumed to be equal to that of the space current conducted in the tube 149. An additional voltage drop is produced in the load resistor 159, thereby decreasing the amplitude of the voltage derived from the output terminal as represented at 177 of the curve 174.

In the next succeeding time interval the voltage impressed upon the control grid 164 of tube 148 decreases to a minimum as indicated at 178 of curve 134 and the voltage impressed upon the control grid 167 of tube 149 also decreases to a minimum as indicated at 179 of curve 137. Consequently, the conduction of space current is interrupted in both of the adder tubes, thereby developing a voltage of maximum positive amplitude at the output terminal, as indicated at 181 of curve 174. The described cycle of operation is then repeated.

In order to develop the oppositely phased voltages 36 of Figure 1 and 59 of Figure 2, the respective keying voltage sources 37 and 61 also include additional voltage adder apparatus similar to that described with reference to Figure 10. In this case, however, the control grids 164 and 167, respectively, of tubes 148 and 149 are coupled to output treminals D and E of the ring multi-vibrator of Figure 8, whereby to add the voltages having the waveforms represented by the curves 135 and 136. In view of the foregoing description of the manner in which apparatus of the character shown in Figure 10 functions to produce a stepped wave voltage of the form represented by the curve 174 of Figure 9 by adding voltages represented by curves 134 and 137, it should be obvious, without further description, that similar apparatus will produce a stepped wave voltage of the form represented by the curve 182 of Figure 9 by adding voltages represented by the curves 135 and 136.

It is to be understood that the improved color television system in accordance with the present invention is not necessarily limited for use with the specific apparatus shown and described herein. For example, one of the components of the system is a source of light representing, in black and white, the different color components of the image to be reproduced. Principally for convenience and simplicity herein such a source of light has been referred to as a cathode ray tube such as the usual kinescope popularly employed in television receivers. It will be apparent, however, that wherever it may be found to be more convenient or desirable, other sources of image representative light such as a moving picture film, a source of unmodulated light used in conjunction with a light valve, for example, may be used in other embodiments of the invention. A light valve employed in conjunction with an independent source of white light may be found to have certain advantages for use in a color television system operating in accordance with the dot multiplex system such as that disclosed in the copending Evans application referred to. Systems of this character require relatively high frequency of color changes in view of which some types of cathode ray tubes may be found to impose limitations upon the successful operation of such systems by reason of the fact that the phosphors of which the luminescent screens of such tubes are made necessarily have certain finite times of decay. Conceivably, this property of cathode ray tubes could limit the usefulness of the tubes in a system of the character embodying the present invention for the reason that any particular screen area may be excited to emit light representative of one color and at a succeeding later instant be required to produce light representative of a different color component of the image. Unless the phosphor has the property of decaying substantially completely within the time occurring between successive excitations thereof, it is seen that there will be objectionable color dilution effected. However, it is to be clearly understood that such a limitation exists only with respect to cathode ray tubes including luminescent screens made of phosphors having relatively long decay times.

The improved color filter device in accordance with this invention also will be understood to be susceptible of excitation by suitable voltages having waveforms other than the sinusoidal waveform illustratively shown and described herein. In general, it will be apparent that the waveform of the voltage by which the transparent medium is excited for the production of standing pressure waves therein determines the configuration of the effective lenticular elements formed in the medium. For example, in the illustrative embodiment of the invention disclosed herein the transparent medium is excited by a sinusoidal voltage whereby to produce substantially cylindrical lenticular elements in the transparent medium. If, instead of a voltage having such a waveform, the transparent medium is excited by one having a sawtooth waveform, the lenticular elements also will have substantially sawtooth configurations. Furthermore, it is considered to be within the scope of the present invention to provide additional excitation of the transparent medium whereby to produce different forms of lenticular bodies within the transparent medium. For example, the medium may be additionally excited substantially at right angles to the illustratively disclosed excitation. Such a mode of operation will enable the formation within the transparent medium of a two dimensional lenticular body.

It thus is apparent that the present invention has a number of advantages over systems and apparatus previously devised for the purpose of effecting image reproduction substantially in natural colors. One of the more important advantages of the present system is that it provides a relatively simple arrangement which is completely non-mechanical for colored image reproduction. The system, therefore, is inherently fast in its operation, thereby rendering it easily adaptable for use in any of the well known types of color television systems including the field or frame sequential, the line sequential and the dot multiplex systems. Furthermore, by virtue of the character of the color filter device in accordance with this invention and the manner in which it may be used, it may, if desired, be made relatively small, particularly when used in conjunction with a projection type of reproducing device. Also, the use of such a color filter device renders the conversion of an existing black and white image reproducing system to one capable of reproducing images substantially in their natural colors a relatively simple matter. It will also be seen that, when the color filter device in accordance with one of the features of this invention is made by the illustratively disclosed process in accordance with another feature of the invention, the different color registrations are particularly good because the striations of the color filter device are produced by precisely the same means employed to selectively direct the white light therethrough in the operation of the device.

It will be understood that the nature of the invention may be ascertained from the foregoing disclosure of an illustrative embodiment thereof which is typical of other modifications within the spirit of the invention, and the scope of the invention may be determined from the following claims.

What is claimed is:

1. A color television image reproducing system, comprising means for producing a plurality of black and white partial images representative respectively of a plurality of color components of an image to be reproduced, a color filter device located in the path of light from said image-producing means, a transparent medium located in said light path between said image-producing means and said filter device, means for producing pressure waves in said medium, thereby forming a plurality of effective lenses in said medium by which to focus said light upon a group of areas of said filter device capable of transmitting light of a predetermined one of said plurality of colors, and means for variably positioning said pressure waves concurrently with color changes of said partial images to focus said light upon a different group of areas of said filter device capable of transmitting light of different colors corresponding with the colors represented by said partial images.

2. A color television image reproducing system, comprising means for producing a plurality of black and white partial images representative respectively of a plurality of color components of an image to be reproduced, a striated color filter device located in the path of light from said image-producing means, a transparent medium located in said light path between said image-producing means and said filter device, means for exciting said medium to produce pressure waves therein, thereby forming a plurality of effective lenses in said medium by which to focus said light upon striations of said filter device capable of transmitting light of a predetermined one of said plurality of colors, and means for variably positioning said pressure waves concurrently with color changes of said partial images to focus said light upon different striations of said filter device capable of transmitting light of different colors corresponding with the colors represented by said partial images.

3. A color television image reproducing system, comprising means for producing a plurality of black and white partial images representative respectively of a plurality of color components of an image to be reproduced, a striated color filter device located in the path of light from said image-producing means, an acoustically rigid transparent medium located in said light path between said image-producing means and said filter device, means including a first source of wave energy for producing pressure waves in said medium, thereby forming a plurality of effective lenses in said medium by which to focus said light upon striations of said filter device capable of transmitting light of a predetermined one of said plurality of colors, and means including a second source of energy for variably positioning said pressure waves concurrently with color changes of said partial images to focus said light upon different striations of said filter device capable of transmitting light of different colors corresponding with the colors represented by said partial images.

4. A color television image reproducing system, comprising a cathode ray tube having a luminescent screen for producing a plurality of black and white partial images representative respectively of a plurality of color components of an image to be reproduced, a striated color filter device located in the path of light from said screen, an acoustically hard transparent medium located in said light path between said screen and said filter device, means including a source of exciting wave energy for producing standing pressure waves in said medium, thereby forming a plurality of effective condensing lenses in said medium by which to focus said light upon striations of said filter device capable of transmitting light of a predetermined one of said plurality of colors, and means including a source of color-selecting wave energy for variably positioning said pressure waves concurrently with color changes of said partial images to focus said light upon different striations of said filter device capable of transmitting light of different colors corresponding with the colors represented by said partial images.

5. A color television image reproducing system, comprising a cathode ray tube having a luminescent screen and means including an electron beam for producing a plurality of black and white partial images representative respectively of a plurality of color components of an image to be reproduced, a striated color filter device located in the path of light from said screen, an acoustically hard transparent medium located in said light path between said screen and said filter device, means including a source of sinusoidal wave energy for producing sinusoidal standing pressure waves in said medium, thereby forming a plurality of effective cylindrical lenses in said medium by which to focus said light upon striations of said filter device capable of transmitting light of a predetermined one of said plurality of colors, and means including a source of stepped wave energy for variably positioning said standing waves concurrently with color changes of said partial images to focus said light upon different striations of said filter device capable of transmitting light of different colors corresponding with the colors represented by said partial images.

6. A color filter device for use in conjunction with a source of image representative substantially white light in a color television image reproducing system, comprising a transparent medium located in the path of light from said source and being susceptible of having pressure waves produced therein, a striated translucent element located adjacent one side of said medium in said light path, said striations being capable respectively of transmitting light of different colors, an exciting vibratory device mounted adjacent said medium and energizable to produce pressure waves in said medium angularly oriented relative to said light path, and at least one additional vibratory device mounted adjacent said medium and energizable to variably position said pressure waves in said medium, whereby to successively focus said white light onto differently colored light-transmitting striations of said trauslucent element.

7. A color filter device for use in conjunction with a source of image representative substantially white light in a color television image reproducing system, comprising an acoustically hard transparent medium located in the path of light from said source, a striated translucent element located on one side of said medium in said light path, said striations being arranged in successive groups with corresponding striations of said groups capable respectively of transmitting light of different colors, an exciting vibratory device mounted adjacent said medium and energizable to produce pressure waves in said medium substantially perpendicularly to said light path, and a pair of additional vibratory devices mounted adjacent said medium and energizable to variably position said pressure waves in said medium, whereby to successively focus said white light onto different corresponding striations of said translucent element.

8. A color filter device for use in conjunction with a source of image representative substantially white light in a color television image reproducing system, comprising an acoustically hard transparent medium located in the path of light from said source, a striated translucent element located in the path of light emerging from said medium, said striations being arranged in successive groups with corresponding striations of said groups capable respectively of transmitting light of different colors, an exciting vibratory device mounted adjacent one end of said medium parallel to the path of light through said medium and energizable to produce pressure waves in said medium, and a pair of additional vibratory devices mounted respectively adjacent said exciting device and the opposite end of said medium, said pair of additional devices defining a pressure wave propagation path in said medium in which to produce standing pressure waves by which to focus white light entering said medium onto corresponding striations of said translucent element, said pair of additional devices being energizable in opposite sense to variably position said standing waves in said medium, whereby to successively focus said white light onto different corresponding striations of said translucent element.

9. A color filter device for use in conjunction with a source of image representative substantially white light in a color television image reproducing system, comprising an acoustically hard transparent material, a transparent element located on one side of said material, a striated translucent element located on the opposite side of said material, said striations being arranged in successive groups with corresponding striations of said groups capable respectively of transmitting light of different colors, an exciting electro-mechanical vibratory device mounted adjacent one of a second pair of opposite sides of said material and energizable to produce pressure waves in said material, and a pair of additional electro-mechanical vibratory devices mounted respectively adjacent said second pair of opposite sides of said material, one of said pair of additional devices supporting said exciting crystal and the other of said pair of additional devices reflecting said pressure waves to produce standing pressure waves in said material by which to focus light entering said transparent element onto corresponding striations of said translucent element, said pair of additional devices being simultaneously energizable in opposite sense to variably position said standing waves in said material, whereby to successively focus light entering said transparent element onto different corresponding striations of said translucent element.

10. A color filter device for use in conjunction with a source of image representative substantially white light in a color television image reproducing system, comprising a container filled with an acoustically hard transparent material, one of a first pair of opposite walls of said container having a transparent area and the other of said walls having a striated translucent area, said striations being arranged in successive groups with corresponding striations of said groups capable respectively of transmitting light of different colors, a piezo-electric exciting crystal mounted adjacent one of a second pair of opposite walls of said container and energizable to produce pressure waves in said material, and a pair of additional piezo-electric crystals mounted respectively adjacent said second pair of container walls, one of said pair of crystals supporting on one face thereof said exciting crystal and the other of said pair of crystals reflecting said pressure waves to produce standing pressure waves in said material by which to focus light entering said transparent area onto corresponding striations of said translucent area, said pair of crystals being simultaneously distortable in opposite sense to variably position said standing waves in said container, whereby to successively focus light entering said transparent area onto different corresponding striations of said translucent area.

11. A color filter device for use in conjunction with a source of image representative substantially white light in a color television image reproducing system, comprising a container filled with an acoustically hard transparent liquid, one of a first pair of opposite substantially parallel walls of said container having a transparent area and the other of said walls having a striated translucent area, said striations having substantially identical dimensions and being arranged in successive groups with corresponding striations of said groups capable respectively of transmitting light of different colors, a piezo-electric exciting crystal mounted adjacent one of a second pair of opposite substantially parallel walls of said container and energizable to produce pressure waves in said liquids, and a pair of similar piezo-electric crystals mounted respectively adjacent said second pair of container walls, one of said pair of crystals supporting on one face thereof said exciting crystal and the other of said pair of crystals reflecting said pressure waves to produce standing pressure waves in said liquid by which to focus light entering said transparent area onto corresponding striations of said translucent area, said pair of crystals being simultaneously distortable in substantially equal magnitude and in opposite sense to variably position said standing waves in said container, whereby to successively focus light entering said transparent area onto different corresponding striations of said translucent area.

12. The method of making a striated color filter screen, said filter screen having striations capable respectively of transmitting light of different colors, said method comprising the steps of (1) forming pressure waves in a transparent medium, (2) exposing at least one striated area of a layer of photosensitive material to light through said pressure waves, (3) removing the unexposed portions of said material, (4) coloring the exposed residual portion of said material a predetermined color, (5) moving said pressure waves in said material, and repeating steps (2), (3), (4) and (5) with respect to other striated areas of said material, each time coloring the exposed residual portions of said photosensitive material a different color until all portions of said filter screen are covered.

13. The method of making a striated color filter screen, said filter screen having a multiplicity of striations capable of transmitting light of different colors and arranged in successive groups of recurring color transmitting properties, said method comprising the steps of, (1) forming pressure waves in a transparent medium, (2) exposing a plurality of striated areas of a layer of photosensitive material to light through said pressure waves, (3) removing the unexposed portions of said material, (4) coloring the exposed residual portions of said material a predetermined color, (5) moving said pressure waves in said medium, and repeating steps (2), (3), (4) and (5) with respect to other pluralities of striated areas, each time coloring the exposed residual portions of said photosensitive material a different color until all portions of said filter screen are covered.

14. The method of making a striated color filter screen for use in a color television system, said filter screen having a multiplicity of striations capable of transmitting light of different colors and arranged in successive groups of recurring color transmitting properties, said method comprising the steps of, (1) forming pressure waves in a transparent medium, (2) exposing a selected group of striated areas of a layer of photosensitive material to light through said pressure waves, (3) removing the unexposed portions of said material, (4) coloring the exposed residual portions of said material a predetermined color, (5) moving said pressure waves relative to said exposed portions of said material, and repeating steps (2), (3), (4), and (5) with respect to other groups of striated areas, each time coloring the exposed residual portions of said photosensitive material a different color until all portions of said filter screen are covered.

15. The method of making a striated color filter screen for use in a color television system, said filter screen having a multiplicity of striations capable of transmitting light of different colors and arranged in successive groups of recurring color transmitting properties, said method comprising the steps of, (1) forming standing pressure waves in a transparent medium, (2) exposing a selected group of striated areas of a layer of photosensitive material to light through said standing pressure waves, (3) dissolving the unexposed portions of said material, (4) dyeing the exposed residual portions of said material a predetermined color, (5) moving said standing pressure waves along their path of propagation, and repeating steps (2), (3), (4) and (5) with respect to other groups of striated areas, each time dyeing the exposed residual portions of said photosensitive material a different color until all portions of said filter screen are covered.

16. The method of making a striated color filter screen for use in a color television system, said filter screen having a multiplicity of striations capable of transmitting light of different colors and arranged in successive groups of recurring color transmitting properties, said method comprising the steps of, (1) forming standing pressure waves in a transparent acoustically rigid medium, (2) exposing a selected group of striated areas of a layer of photosensitive material to monochromatic light focussed by said standing pressure waves, (3) washing away the unexposed portions of said material, (4) dyeing the exposed residual portions of said material a predetermied color, (5) moving said standing pressure waves along their path of propagation, and repeating steps (2), (3), (4) and (5) with respect to other groups of striated areas, each time dyeing the exposed residual portions of said photosensitive material a different color until all portions of said filter screen are covered by colored striations.

JOHN EVANS.

References Cited in the file of this patent

UNITED STATES PATENTS

| Number | Name | Date |
|---|---|---|
| 2,109,540 | Leishman | Mar. 1, 1938 |
| 2,350,892 | Hewson | June 6, 1944 |
| 2,493,200 | Land | Jan. 3, 1950 |
| 2,513,520 | Rosenthal | July 4, 1950 |
| 2,528,510 | Goldmark | Nov. 7, 1950 |
| 2,557,794 | Kibler | June 26, 1951 |

FOREIGN PATENTS

| Number | Country | Date |
|---|---|---|
| 473,061 | Great Britain | Oct. 5, 1937 |
| 620,032 | Great Britain | Mar. 18, 1949 |